United States Patent [19]

Zura

[11] 4,295,379
[45] Oct. 20, 1981

[54] GAGE TO MEASURE TRACK TENSION

[75] Inventor: Boris Zura, Sterling Heights, Mich.

[73] Assignee: The United States of America as represented by the Secretary of the Army, Washington, D.C.

[21] Appl. No.: 118,136

[22] Filed: Feb. 4, 1980

[51] Int. Cl.³ .............................................. G01L 1/04
[52] U.S. Cl. ................................. 73/862.62; 177/225
[58] Field of Search ............. 73/141 A, 141 AB, 381; 177/186, 225, 234

[56] References Cited

U.S. PATENT DOCUMENTS

| 978,204 | 12/1910 | Prouty | 177/186 |
| 2,703,980 | 3/1955 | Tell | 73/141 A |

FOREIGN PATENT DOCUMENTS 558181 6/1977 U.S.S.R. ........................ 78/141 A

Primary Examiner—Charles A. Ruehl
Attorney, Agent, or Firm—Peter A. Taucher; John E. Becker; Nathan Edelberg

[57] ABSTRACT

A pair of flanged telescoping covers houses a main spring comprising two opposed Belleville discs, which provide the elastically deformable metal that is squeezed when the gage is placed between the track and an idler wheel. Cam mechanism occupies a central cavity provided by both covers, wherein a pin held against rotation by one cover engages slots in a cup movable in the other cover against a helical spring. The cup carries a pointer which moves across a scale.

8 Claims, 12 Drawing Figures

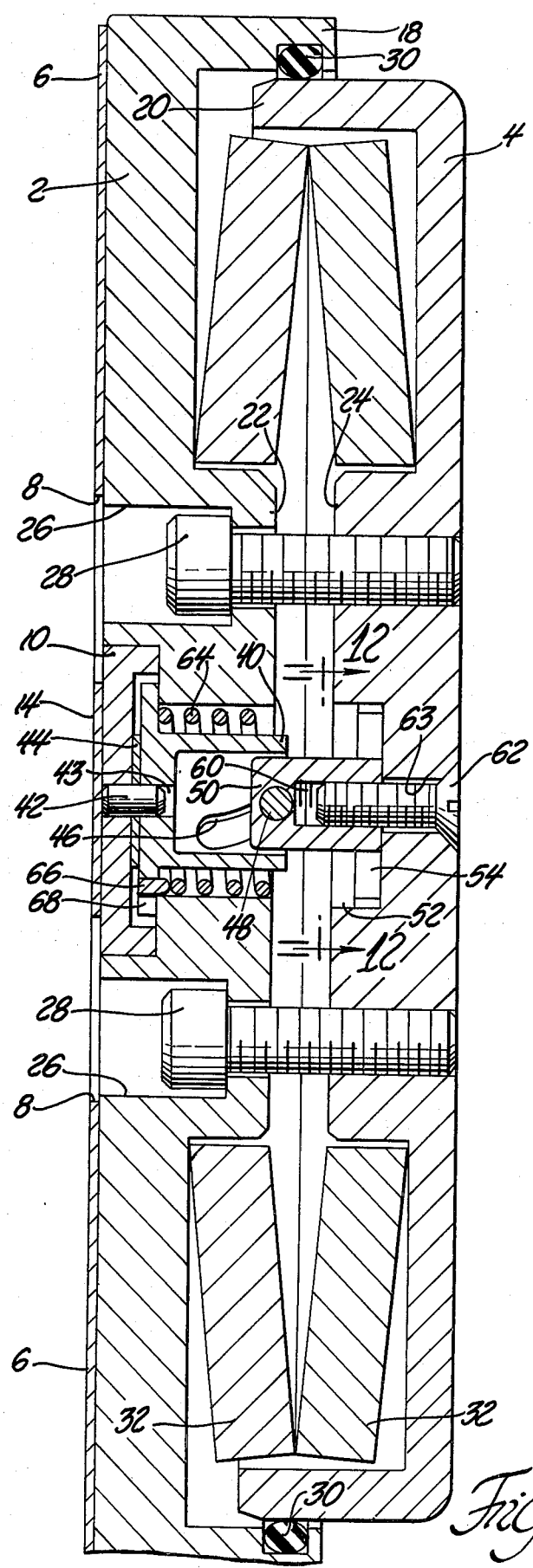
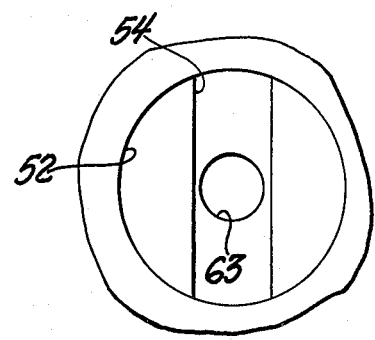
Fig. 12
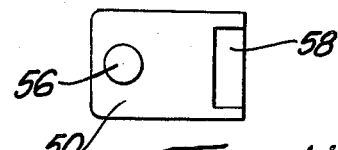
Fig. 11
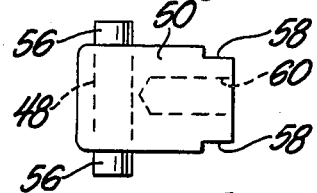
Fig. 10
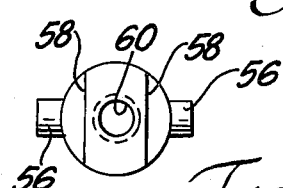
Fig. 9
Fig. 3
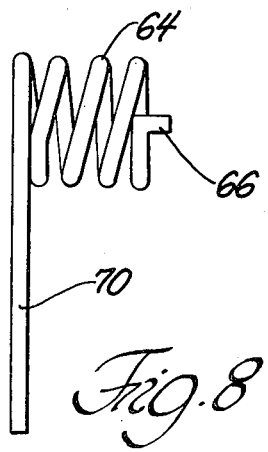
Fig. 8

GAGE TO MEASURE TRACK TENSION

DEDICATORY CLAUSE

The invention described herein may be manufactured, used, and licensed by or for the U.S. Government for governmental purposes without payment to me of any royalty thereon.

BACKGROUND AND THE PRIOR ART

The tracks of track-laying vehicles have always presented a problem in that track tension should be great enough to minimize throwing off the track, but not unnecessarily great because the greater the tension in the track is, the greater is the load on the bearings of the wheels which pull the track tight.

Experience can be relied on to determine optimum tension in a given track system. The problem then becomes one of measuring track tension in a reliable way so that adjustments may be made in track tension to keep the tension close to its optimum value.

Heretofore, it has been the practice to measure track sag (catenary displacement from a straight line) between a selected pair of adjacent rollers. However, such a measurement method is inaccurate and unreliable, especially under field conditions.

SUMMARY OF THE INVENTION

It is an object of the invention to provide troops with a track tension gage which is inexpensive to manufacture, easy to use, accurate, and reliable. This and other objects are achieved in a compact package which is easily applied between the track and an idler wheel. The package consists of two telescoping covers secured against relative rotation as they telescope under track tension to effect elastic deformation of cooperating Belleville springs. Central cavities in the covers are coaxially aligned, facing each other. The two cavities house a cam mechanism to which a pointer arm is secured. The pointer arm has an indicator at its radially outer end which moves along a suitably calibrated scale on one of the covers.

The Belleville springs apply a restoring force when the compressive force which pushes the covers together is removed. An additional spring having two ends occupies the space between the covers, and primarily the coaxial cavities, to eliminate backlash between the cam elements as the compressive force is released.

IN THE DRAWINGS

FIG. 3 is a view in section on a plane substantially on line 3—3 of FIG. 1.

FIG. 8 is an elevation view of the additional spring means cited in some of the claims.

FIG. 9 is an end view of one of the cam elements.

FIG. 10 is a side elevation view of the piece shown in FIG. 9.

FIG. 11 is another side elevation view of the piece shown in FIG. 10, but from a plane perpendicular to the plane of FIG. 10; and FIG. 12 is a view from the plane on the line 12—12 of FIG. 3, but without the cam element shown in FIGS. 9, 10 and 11.

DESCRIPTION IN DETAIL

Basic to a gage embodying this invention, from the viewpoint of structure, are the covers 2 and 4. Cover 2 for convenience is here called the bottom cover, and 4 is called the top cover, because, in use, cover 2 is placed on the inner surface of a track pad so will be on the under side of the gage. In that position, cover 4 will be on top. A piece of emery cloth 6 is cemented to the circular outer surface of bottom cover 2 to minimize sliding of the gage on the track pad.

Figure 1:
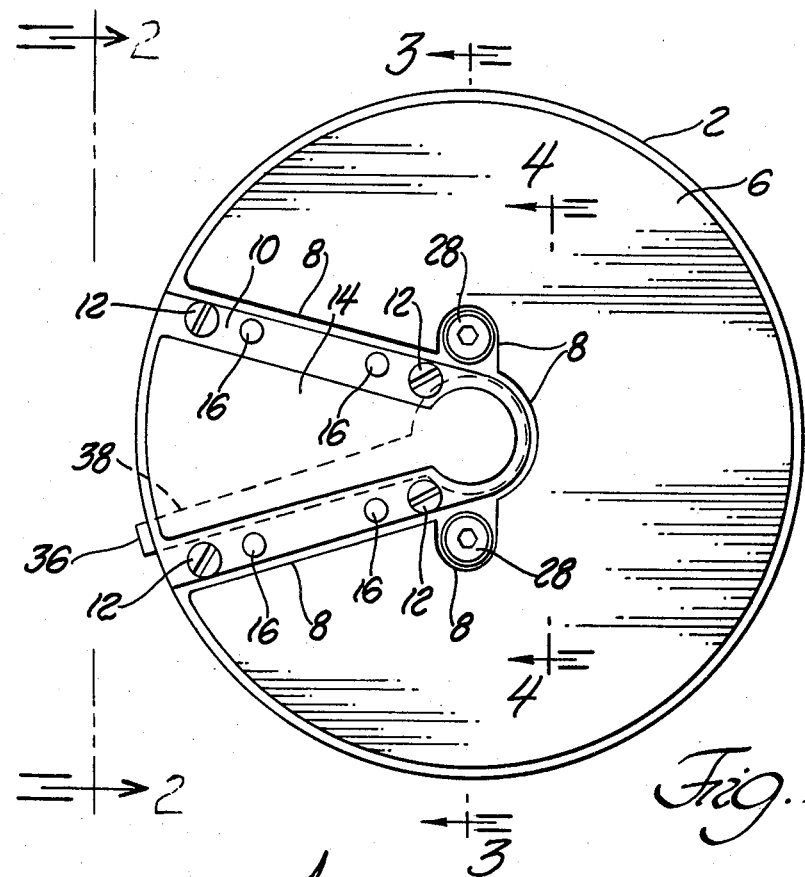
FIG. 1 is an elevation view of the gage being a full face view of the larger one of the two covers. It depicts the gage as seen from a plane substantially on line 1—1 of FIG. 2.

In the left half (approximately) of emery cloth 6, as seen in FIG. 1, a portion of cloth 6 is cut out along the outline there identified by reference character 8 in order to leave exposed an access door 10 which is secured in place by threaded members 12. A sector 14 of emery cloth is cemented to and covers the greater part of door 10, leaving exposed (uncovered by emery cloth) the threaded members 12 and four dowel pins 16 which engage suitable aligned openings in door 10 and in bottom cover 2.

At their peripheries, covers 2 and 4 are flanged as at 18 and 20 respectively, and are provided with centrally located bosses 22 and 24 respectively. Cover 2 is provided with two stepped bores 26 in its boss 22 to receive the head ends of threaded members 28, the threaded ends of which engage threaded openings in boss 24 of cover 4.

Covers 2 and 4 reciprocate relative to each other, and the adjacent cylindrical surfaces of flanges 18 and 20 are sealed against the passage of foreign matter by a suitable elastomeric seal 30, shown in FIG. 3 as disposed in an internal groove in flange 18 and in engagement with flange 20.

Threaded members 28 serve three basic purposes: they hold the covers against axial separation; they prevent angular displacement of the covers relative to each other; and they permit preloading the compressible spring which gives the gage its measuring capability.

In the gage illustrated, that compressible spring is a pair of opposed Belleville discs 32. Conventionally, such a spring is an annulus; the two discs 32 of this invention occupy the annular cavity between the annular flanges 18 and 20 defining the outer limits of that cavity, and the bosses 22 and 24 defining the inner limits of the cavity. In use, track tension effects elastic deformation of the opposed discs in proportion to the amount of tension.

Figures 2, 6, 7:
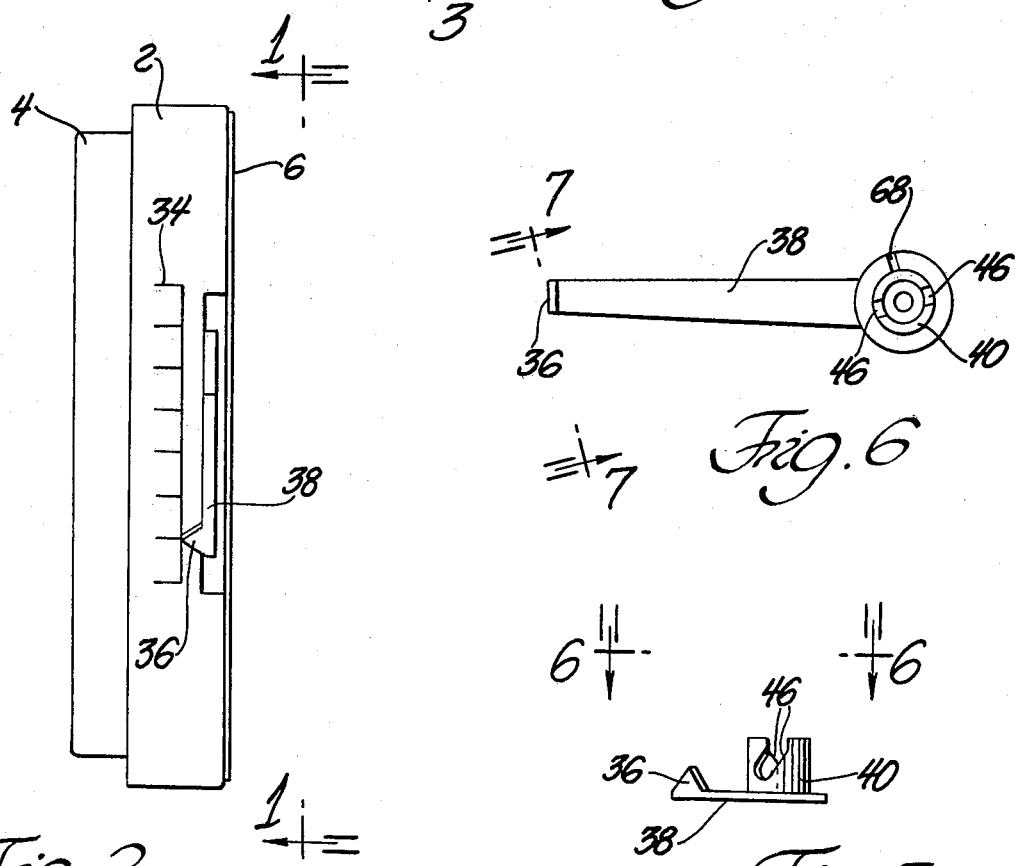
FIG. 2 is an edge-on view of the gage, depicting the gage as seen from a plane substantially on line 2—2 of FIG. 1.
FIG. 6 is a plan view of the pointer arm, as seen from a plane on line 6—6 of FIG. 7.
FIG. 7 is a view of the pointer arm as seen from a plane on line 7—7 of FIG. 6.

An indicator mechanism is provided to give a user of the gage a visual read-out on a calibrated scale of the amount of the tension. Such a scale is shown at 34, FIG. 2, and an indicator 36 on a pointer arm 38 is connected with and driven by a cam mechanism which responds to the aforesaid elastic deformation of the spring comprising Belleville discs 32.

More specifically, pointer arm 38 is mounted on a hub 40; in the embodiment here shown, arm 38 and hub 40 are one integral piece. Hub 40 is centered on a pin 42, which is held (as by a press fit) in a suitable opening in door 10 and has a running fit in an opening 43 in hub 40. A washer 44, FIG. 3, is preferably disposed between hub 40 and the inner surface of door 10.

Hub 40 is provided with a pair of cooperating, diametrically opposed slots 46 which provide the cam follower of the aforesaid cam mechanism. The cam is a pin 48 secured in a locator element 50 resembling a thimble and which projects at its one end (the end that carries pin 48) into hub 40 and at its other end projects into a cavity having a cylindrical bore 52 which is directly open into the face of boss 24; and a long slotted portion 54 directly in communication with the cylindrical bore 52.

The protruding ends 56 of pin 48 are adapted to ride in slots 46 in hub 40. At the end of element 50 opposite the pin 48, element 50 is provided with parallel flat surfaces 58 at the opposite ends of a diameter. Centrally of the same end and between surfaces 58, there is a threaded hole 60 to receive a retention screw 62 extending through opening 63.

Locator element 50 is held in place as seen in FIG. 3 by screw 62 and is held against rotation in boss 24 of cover 4 by the flat surfaces 58 and their engagement with the long sides of elongated slot 54. Thus the ends 56 of pin 48 cam the pointer arm 38 and its indicator 36 by engagement with cam follower slots 46.

Those skilled in the art will realize from the foregoing explanation that the spring comprising Belleville discs 32 provides the elastically deformable material which measures the amount of track tension. However, because a perfect sliding fit of pin ends 56 in slots 46 is not feasible throughout a long life cycle of a gage, there is surely going to be backlash in the pin and slot connection, with the consequent difficulty of accurate calibration of the gage.

To minimize the problem which would result from uncontrolled backlash, the invention is provided with a spring 64, here shown as helical in its overall configuration. At its one end, spring 64 terminates in a longitudinally extending tang 66 which is adapted to engage a notch 68 in hub 40. The other end of spring 64 terminates in a tangential arm 70.

Figure 4:
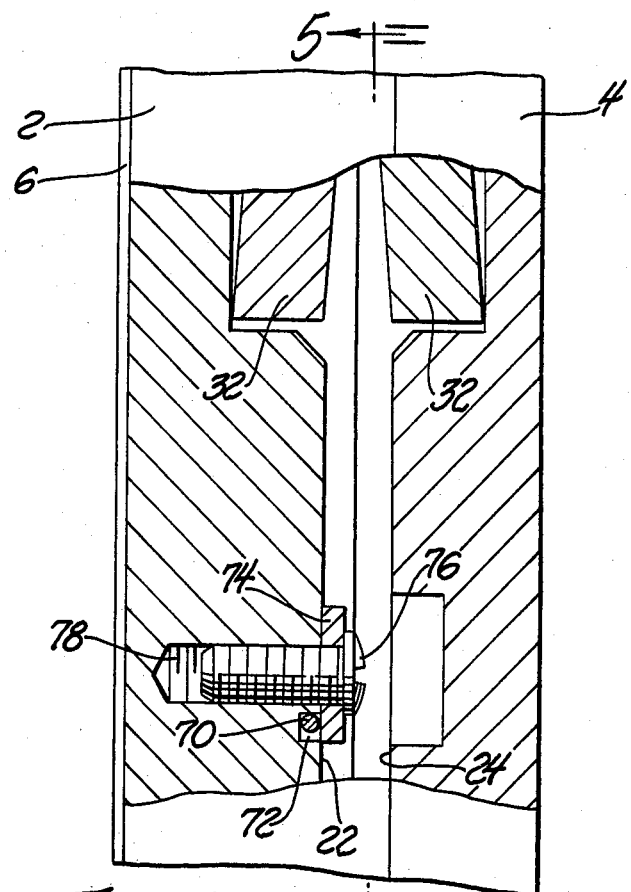
FIG. 4 is a view in section on a plane substantially on line 4—4 of FIG. 1.
Figure 5:
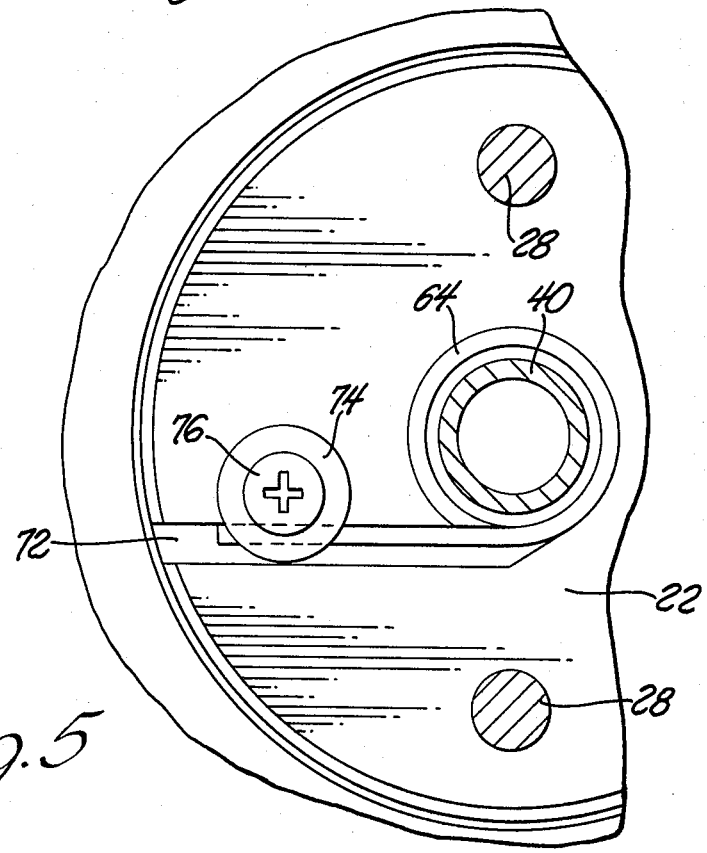
FIG. 5 is a view from a plane on line 5—5 of FIG. 4.

Tangential arm 70 is held in a slot 72 in boss 22, by a washer 74 which overlies slot 72 as best seen in FIGS. 4 and 5 and is in turn secured in place by a screw 76, identifiable in FIG. 5 as a Phillips head screw. Screw 76 engages a threaded hole 78 in boss 22.

It will be appreciated by those skilled in the art that a track tension gage such as is disclosed and claimed here will be subject to tremendous compressive forces. Bottom and top covers 2 and 4 respectively must be structured to withstand such forces, and the requirement extends also to access door 10. Door 10 is of a thinner cross section (see FIG. 3) and must shield the cam mechanism.

Means of strengthening the structure are available to skilled designers, such as ribs (not shown) formed integral with the covers 2 and 4 and door 10. The expedient adopted here comprises the four dowels 16 referenced above, which engage the door and cover 2 and thus leave threaded members 12 primarily the function of keeping door 10 in place.

OPERATION

The gage is placed on the lower run of the track with the grit surface 6 in contact with a track shoe pad. The vehicle is then moved enough to bring the gage between the idler wheel and the track.

The Belleville discs are squeezed together an amount which is of course proportional to the compressive force encountered, and that compressive force is a function of the track tension.

The position of indicator 38 relative to scale 34 is noted and recorded, and the vehicle is moved again in the direction opposite to the movement to put the gage between the track and the idler wheel, to free the gage.

The design of helical spring 64 is such that it must be preloaded in assembly of the parts. Accordingly, pin ends 56 will always be biased against the same side of each of slots 46, thus minimizing the backlash which is inevitable in such a structure, especially in view of wear which is certain to occur.

I wish it to be understood that I do not desire to be limited to the exact details of construction shown and described for obvious modifications will occur to a person skilled in the art.

What is claimed is:

1. A gage to measure the tension in the track of a track laying vehicle comprising:
   a. a compressible spring,
   b. a housing for said spring having telescoping inside and outside housing covers and a central axis,
   c. the covers having aligned cavities along said axis,
   d. means, including cam and cam follower elements, in the cavities to convert relative translatory movement of one element along said axis into angular movement of the remaining element about said axis,
   e. a radially disposed indicator arm secured to the angularly movable element,
   f. means to secure the two covers against relative angular movement while permitting relative telescoping of the covers along said axis, and
   g. additional spring means to oppose said angular movement.

2. A gage as in claim 1, wherein:
   a. the cavity in one of the covers includes a non-circular portion, and
   b. one element of the first-named means has a non-circular external surface in engagement with the non-circular portion of said cavity.

3. A gage as in claim 2, wherein said one element is basically a cylinder in shape, and the non-circular external surface includes a planar surface formed in the cylinder.

4. A gage as in claim 1 or claim 3, wherein the additional spring means is a spring having two ends, one end secured to one of said covers and its other end secured to said remaining element.

5. A gage as defined in claim 1, wherein relative to said cam and cam follower elements of paragraph (d), one of the said elements is a hollow hub, and the other element is a thimble having an end extending into the hollow hub.

6. The gage as defined in claim 5, further including a projection on said thimble designated one of the said elements, and a complementary slot in the hollow hub designated as the other element, and wherein when the said projection engages the slot, cooperation of the projection and the slot during relative translatory movement causes the aforesaid angular movement of one of the elements relative to the other.

7. The gage as defined in claim 1 or 3, wherein said indicator arm projects exteriorly of said housing, and said housing having exteriorly thereon a calibrated scale which is suitably placed for cooperation with said indicator arm to facilitate visual reading of the gage.

8. The gage as defined in claim 1, wherein said compressible spring comprises a pair of cooperating Belleville disc spring elements.

* * * * *